A. SILVERMAN.
ILLUMINATOR FOR MICROSCOPES.
APPLICATION FILED FEB. 19, 1917.
1,311,185.
Patented July 29, 1919.
FIG. 1
FIG. 2
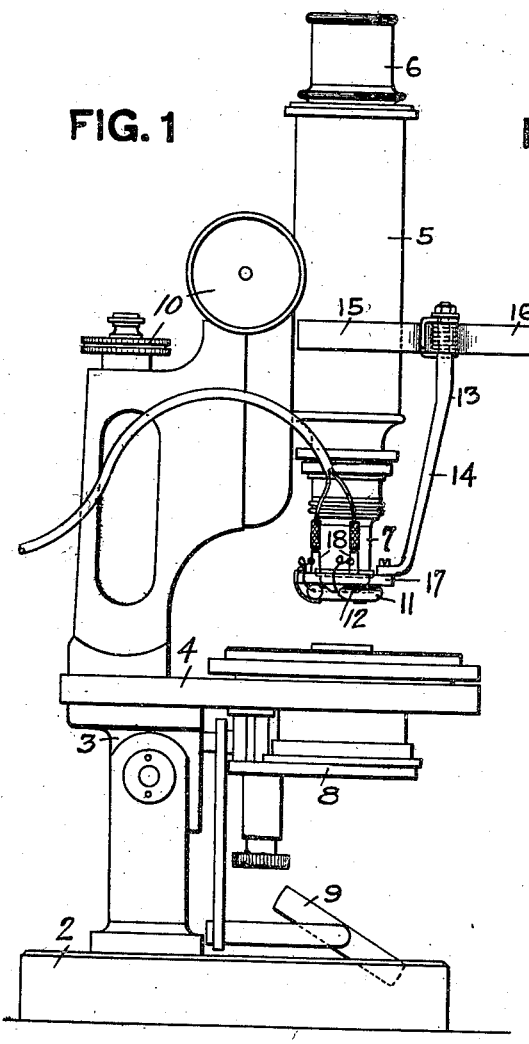
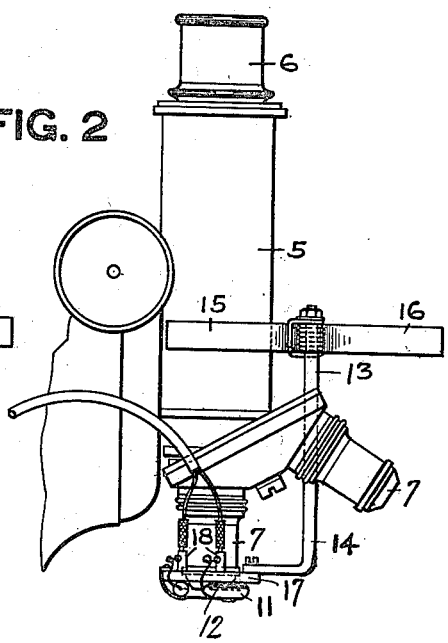
FIG. 3
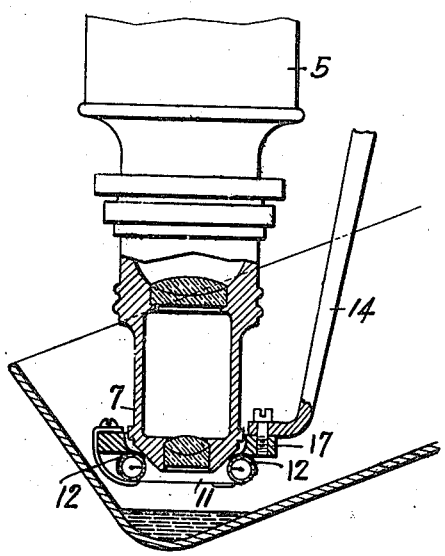
FIG. 4
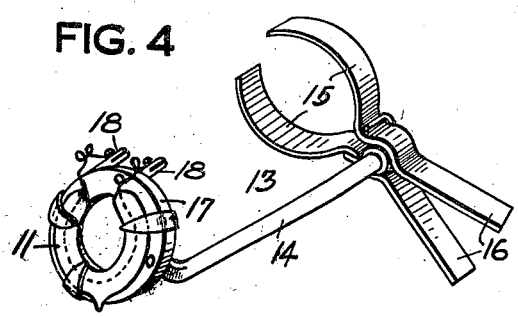
INVENTOR
Alexander Silverman
By Kay Totheut Powell
Attorneys

UNITED STATES PATENT OFFICE.

ALEXANDER SILVERMAN, OF PITTSBURGH, PENNSYLVANIA.

ILLUMINATOR FOR MICROSCOPES.

1,311,185.  Specification of Letters Patent.  Patented July 29, 1919.

Application filed February 19, 1917. Serial No. 149,501.

*To all whom it may concern:*

Be it known that I, ALEXANDER SILVERMAN, a citizen of the United States, and resident of Pittsburgh, in the county of Allegheny and State of Pennsylvania, have invented a new and useful Improvement in Illuminators for Microscopes; and I do hereby declare the following to be a full, clear, and exact description thereof.

My invention relates to magnifying instruments, microscopes and the like, and has particular reference to means for illuminating the field of the objective of these instruments.

The invention is devised primarily to provide artificial illumination for the field, or the object, and has special advantages when by reason of the nature or location of the field, or of the object, natural or other lighting of the field's zone as now employed is not available for efficient illumination, or requires adjustment in changes of the position of the microscope. In Letters Patent of the United States No. 1,267,287 granted to me May 21st 1918, I have set forth and claimed certain means for illuminating the field of the objective of a microscope, and the present invention relates to some more specific means for adjusting the lamp in position.

The invention also aims to provide means for amplifying the available light, if said light is inefficient. Inefficient light and light precluded from the field include instances when the field or the object to be observed is in a recess, the walls of which shroud the same in such manner as to cause the light to be inefficient for clear observation. For example, when the object, either transparent or opaque, must be supported on or contained in opaque supports or vessels which prevent or preclude the light, or deflect the light rays to prevent efficient illumination.

Further objects are,—to include means for concentrating the light directly on the object to be examined; and distributing the light uniformly along the best lines for observation; protecting the eye of the observer from the light and adjusting the light with respect to the focal position of the objective lens, as that lens is adjusted.

In the accompanying drawings, Figure 1 is a side elevation of a microscope with my invention applied thereto; Fig. 2 is a similar view of an instrument having a plurality of objectives and showing the invention arranged for use with such class of instruments; Fig. 3 is an enlarged vertical section of the objective of an instrument and my light invention as employed for use in making observations in vessels which precludes efficient light from other sources; and Fig. 4 is a perspective view of the device detached from the instrument.

The invention as illustrated in Fig. 1 is shown as applied to a microscope comprising a base and pillar 2, supporting an inclination joint 3, and the stage 4. The stage carries the body-tube 5 with its draw-tube and eye-piece 6, and has the objective 7. The sub-base for supporting the condenser lens and diaphragm is indicated at 8, and the light-projecting mirror for illuminating the object from below is shown at 9. The body-tube is arranged for focusing by suitable rack and pinion, (not shown) and is operated by the hand-wheels 10. All of the above structure is usual with instruments of this class and forms no part of the present invention—and the instrument is shown only as one example of a microscope for which the invention is adapted.

The means for artificially illuminating the field of the objective, and the object itself, consists in an illuminator or light preferably an electric lamp, adapted to surround and lie close to the objective lens, and to directly illuminate the field within the view of the lens while providing for the protection of the person using the microscope from the light rays, the light moving with the lens as it is adjusted, so that while the eye of the observer is protected, the work to be observed is always directly illuminated. The lamp is indicated at 11, and may be any suitable electric or other lamp, or a series of lights arranged to lie concentric with the lens. I prefer to employ a small single light of circular form, as shown, for the reason that such form of lamp may be conveniently arranged for the purpose.

The lamp thus consists of a small tube containing the light source and bent in a circle, so that it surrounds the nose of the objective. While the lamp may thus be entirely protected from the eye of the observer, I also prefer that the upper part of the tube or lamp be enameled or so coated as to form a reflector, as at 12, thus intensifying the light upon the field or object to be observed. The light is carried upon a holder 13 adapted to support the light, which is made so as to be readily detachable and be adjustable on the instrument.

The holder comprises an arm 14, provided at its upper end with spring clamps 15 operated by finger-arms 16 for attachment to the instrument. The clamps preferably are fashioned to grasp the body tube of the instrument as such body tube is generally concentric with the lens-barrel and movable therewith as the objective is adjusted, and it thus affords convenient means for quickly connecting the light to the microscope in proper position for use. To the lower end of the arm is secured a ringlike member 17 which holds the illuminator or light 11 concentrically around the base of the objective in close relation thereto and in concentric position therewith, so that the light is projected downwardly upon the field. Suitable contact posts 18 or other connections are secured to the ring to connect the lamp to the source of light.

It will thus be seen from the above description of the device and its application that it may be readily applied to any character of magnifying instrument to which it is applicable, and that it provides means for illuminating the objects to be examined, giving the advantage, for instance, in all microscopes of direct illumination of the field from a source concentric with the objective, and also providing means for illumination of opaque objects, the objects to be examined in locations which prohibit the employment of the usual illumination.

For example, as shown in Fig. 3, the invention is shown in use in connection with an opaque bowl or any contents thereof. Here it has the advantage of high illumination of the object, whether a solid body or supported in liquid, or even the liquid itself. The device is of particular advantage to bacteriologists, metallographers, and in the chemical industries and in other arts for examining substances contained in deep vessels or the vessels themselves, which because of the shape of the container or of the vessel, prevent the use of other lighting means. It will be apparent that modifications may be made in the structure for the support of the lamp, and in the lamp itself, and I do not wish to limit my invention in these regards.

What I claim is:

1. The combination with a microscope body, of a ringlike electric lamp adapted to surround the objective, a support therefor having means adapted to removably secure said lamp to the microscope body.

2. The combination with a microscope body, of a source of light adapted to surround the objective, and means to secure said source adjustably to the microscope body.

3. The combination with a microscope body of a ringlike electric lamp adapted to surround the objective, a support therefor, and a standard for said support having spring clamps adapted to be secured to the microscope body.

In testimony whereof, I the said ALEXANDER SILVERMAN, have hereunto set my hand.

ALEXANDER SILVERMAN.

Witnesses:
JAMES I. KAY,
JOHN F. WILL.